(12) United States Patent
Ishikawa

(10) Patent No.: US 12,457,434 B2
(45) Date of Patent: Oct. 28, 2025

(54) IMAGE CAPTURING APPARATUS AND CONTROL METHOD THEREOF, IMAGE PROCESSING APPARATUS AND STORAGE MEDIUM

(71) Applicant: CANON KABUSHIKI KAISHA, Tokyo (JP)

(72) Inventor: Naoki Ishikawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 18/436,685

(22) Filed: Feb. 8, 2024

(65) Prior Publication Data
US 2024/0276119 A1    Aug. 15, 2024

(30) Foreign Application Priority Data

Feb. 15, 2023  (JP) .................................. 2023-021871

(51) Int. Cl.
  *H04N 25/77*   (2023.01)
  *H04N 25/76*   (2023.01)
  *H04N 25/767*  (2023.01)

(52) U.S. Cl.
  CPC ........... *H04N 25/77* (2023.01); *H04N 25/767* (2023.01); *H04N 25/7795* (2023.01)

(58) Field of Classification Search
  CPC .. H04N 25/77; H04N 25/767; H04N 25/7795; H04N 25/671; H04N 25/771; H04N 25/589; H04N 25/57; H04N 23/70
  See application file for complete search history.

(56) References Cited

U.S. PATENT DOCUMENTS

| | | | | |
|---|---|---|---|---|
| 6,166,768 A | * | 12/2000 | Fossum | H10F 39/156 |
| | | | | 348/E3.018 |
| 2010/0097501 A1 | * | 4/2010 | Fowler | H04N 25/778 |
| | | | | 348/241 |
| 2013/0076933 A1 | * | 3/2013 | Ahn | H04N 23/40 |
| | | | | 348/222.1 |
| 2013/0135486 A1 | | 5/2013 | Wan | |
| 2019/0028664 A1 | | 1/2019 | Ishii | |
| 2024/0276113 A1 | * | 8/2024 | Ishikawa | H04N 25/77 |

FOREIGN PATENT DOCUMENTS

JP      2017-220896 A    12/2017

OTHER PUBLICATIONS

The above U.S. Patent Application Publication was cited in a European Search Report issued on May 21, 2024, which is enclosed, that issued in the corresponding European Patent Application No. 24153392.6.

* cited by examiner

*Primary Examiner* — Shahbaz Nazrul

(74) *Attorney, Agent, or Firm* — Cowan, Liebowitz & Latman, P.C.

(57) ABSTRACT

An image capturing apparatus comprise a plurality of pixels and a correction unit. Each pixel includes: a photoelectric converter that photoelectrically converts incident light into charge; first and second charge holding sections that hold charge obtained by the photoelectric converter with first and second charge accumulation periods, respectively, and first and second floating diffusion portions that read out first and second signals corresponding to the charges held in the first and second charge holding sections. The correction unit corrects signal levels of the first signal and the second signal based on a difference in capacitance between the first and second floating diffusion portions.

16 Claims, 13 Drawing Sheets

IMAGE CAPTURING APPARATUS AND CONTROL METHOD THEREOF, IMAGE PROCESSING APPARATUS AND STORAGE MEDIUM

BACKGROUND OF THE INVENTION

Field of the Invention

The present invention relates to an image capturing apparatus and control method thereof, image processing apparatus and storage medium.

Description of the Related Art

Among the so-called CMOS image sensors, there is a GS sensor that has a memory section (charge holding section) in each pixel which realizes a global shutter (hereinafter referred to as "GS") function. Each pixel of the GS sensor includes a gate that transfers signal charges accumulated in a photoelectric conversion unit to a charge holding section. In the GS sensor, the GS function is basically realized by simultaneously transferring charge from all photoelectric conversion units to the charge storage sections, and by making the start and end timings of charge accumulation in the photoelectric conversion units the same for all pixels.

In addition, by configuring a plurality of charge holding sections for one photoelectric conversion unit and transferring charge to the charge holding sections multiple times during one frame period, it is possible to obtain a plurality of images based on charges accumulated during different total charge accumulation periods and transferred to the different charge holding sections. Then, by composing the plurality of obtained images, it is possible to obtained an image with the improved dynamic range.

US-2013-0135486 discloses a configuration of a GS pixel having a plurality of charge holding sections for one photoelectric conversion unit. Furthermore, Japanese Patent Laid-Open No. 2017-220896 discloses that two charge holding sections are provided for one photoelectric conversion unit, and charge generated in the photoelectric conversion unit is held alternately in the two charge holding sections for each frame period, and the charge is output to an output unit from one of the two charge holding sections during a period in which charge is not transferred from the photoelectric conversion unit to the charge holding section. This makes it possible to accumulate charge even during the readout period, thereby realizing the GS function.

However, in order to improve the dynamic range, if charges are held in two charge holding sections for different charge accumulation periods, while the accumulated charges are being read out, both charge holding sections hold charges, so it is unable for the charge holding sections to newly hold charges in the next frame. As a result, there are frames in which no signal can be obtained.

Therefore, in order that charge of the next frame can be accumulated while reading out charges from the charge holding sections, the following configuration further having a plurality of charge holding sections in addition to the plurality of charge holding sections from which charges are being read out may be considered.

First, with respect to one photoelectric conversion unit, four charge holding sections and two floating diffusion units (FD) are provided, and each photoelectric conversion unit is connected to the two charge holding sections, and the two charge holding sections are connected to the other two charge holding sections, respectively, in series. Further, the two charge holding sections, connected in series, are respectively connected to different FDs.

Using the above-mentioned configuration, in an arbitrary frame, charge from the photoelectric conversion unit is accumulated in the two former charge holding sections with different charge accumulation periods, and when the charge accumulation is completed, charges held in the former charge holding sections are transferred to the two latter charge holding sections connected in series. Then, in the next frame, charge from the photoelectric conversion unit are again accumulated in the two former charge holding units with different charge accumulation periods, while charges that are accumulated and transferred in the previous frame are transferred from the two latter charge holding sections to FDs. As described above, different FDs are connected to the two latter charge holding sections, so charges accumulated with different charge accumulation periods are transferred to different FDs, and image signals corresponding to the charges are read out. Then, by synthesizing the read-out image signals, an image with a high dynamic range can be obtained without producing a frame in which charge cannot be accumulated.

However, in the above-described configuration, the charges accumulated in the charge holding sections with different charge accumulation periods are transferred to different FDs. Therefore, due to variations in FD capacitance, even if the amounts of accumulated charges are the same, the signal level does not have the same ratio as that of the charge accumulation periods, and the resultant image is not an image obtained by synthesizing the images with appropriate luminance.

SUMMARY OF THE INVENTION

The present invention has been made in consideration of the above situation, and high dynamic range images can be acquired in successive frames while suppressing variations in luminance between pixels.

According to the present invention, provided is an image capturing apparatus comprising: a plurality of pixels; and a correction unit, wherein each pixel includes: a photoelectric converter that photoelectrically converts incident light into charge; first and second charge holding sections that hold charge obtained by the photoelectric converter with first and second charge accumulation periods, respectively, and first and second floating diffusion portions that read out first and second signals corresponding to the charges held in the first and second charge holding sections, wherein the correction unit corrects signal levels of the first signal and the second signal based on a difference in capacitance between the first and second floating diffusion portions.

Further, according to the present invention, provided is an image processing apparatus that processes signals output from an image capturing apparatus having a plurality of pixels, each of which including: a photoelectric converter that photoelectrically converts incident light into charge; first and second charge holding sections that hold charge obtained by the photoelectric converter with first and second charge accumulation periods, respectively, and first and second floating diffusion portions that read out first and second signals corresponding to the charges held in the first and second charge holding sections, the image processing apparatus comprising a correction unit that corrects signal levels of the first signal and the second signal based on a difference in capacitance between the first and second floating diffusion portions.

Furthermore, according to the present invention, provided is a control method of an image capturing apparatus having a plurality of pixels, each of which including: a photoelectric converter that photoelectrically converts incident light into charge; first and second charge holding sections that hold charge obtained by the photoelectric converter with first and second charge accumulation periods, respectively, and first and second floating diffusion portions that read out first and second signals corresponding to the charges held in the first and second charge holding sections, the method comprising correcting signal levels of the first signal and the second signal based on a difference in capacitance between the first and second floating diffusion portions.

Further, according to the present invention, provided is a non-transitory computer-readable storage medium, the storage medium storing a program that is executable by the computer, wherein the program includes program code for causing the computer to function as an image processing apparatus that processes signals output from an image capturing apparatus having a plurality of pixels, each of which including: a photoelectric converter that photoelectrically converts incident light into charge; first and second charge holding sections that hold charge obtained by the photoelectric converter with first and second charge accumulation periods, respectively, and first and second floating diffusion portions that read out first and second signals corresponding to the charges held in the first and second charge holding sections, the image processing apparatus comprising a correction unit that corrects signal levels of the first signal and the second signal based on a difference in capacitance between the first and second floating diffusion portions.

Further features of the present invention will become apparent from the following description of exemplary embodiments (with reference to the attached drawings).

BRIEF DESCRIPTION OF THE DRAWINGS

The accompanying drawings, which are incorporated in and Sconstitute a part of the specification, illustrate embodiments of the invention, and together with the description, serve to explain the principles of the invention.

DESCRIPTION OF THE EMBODIMENTS

Figure 1:
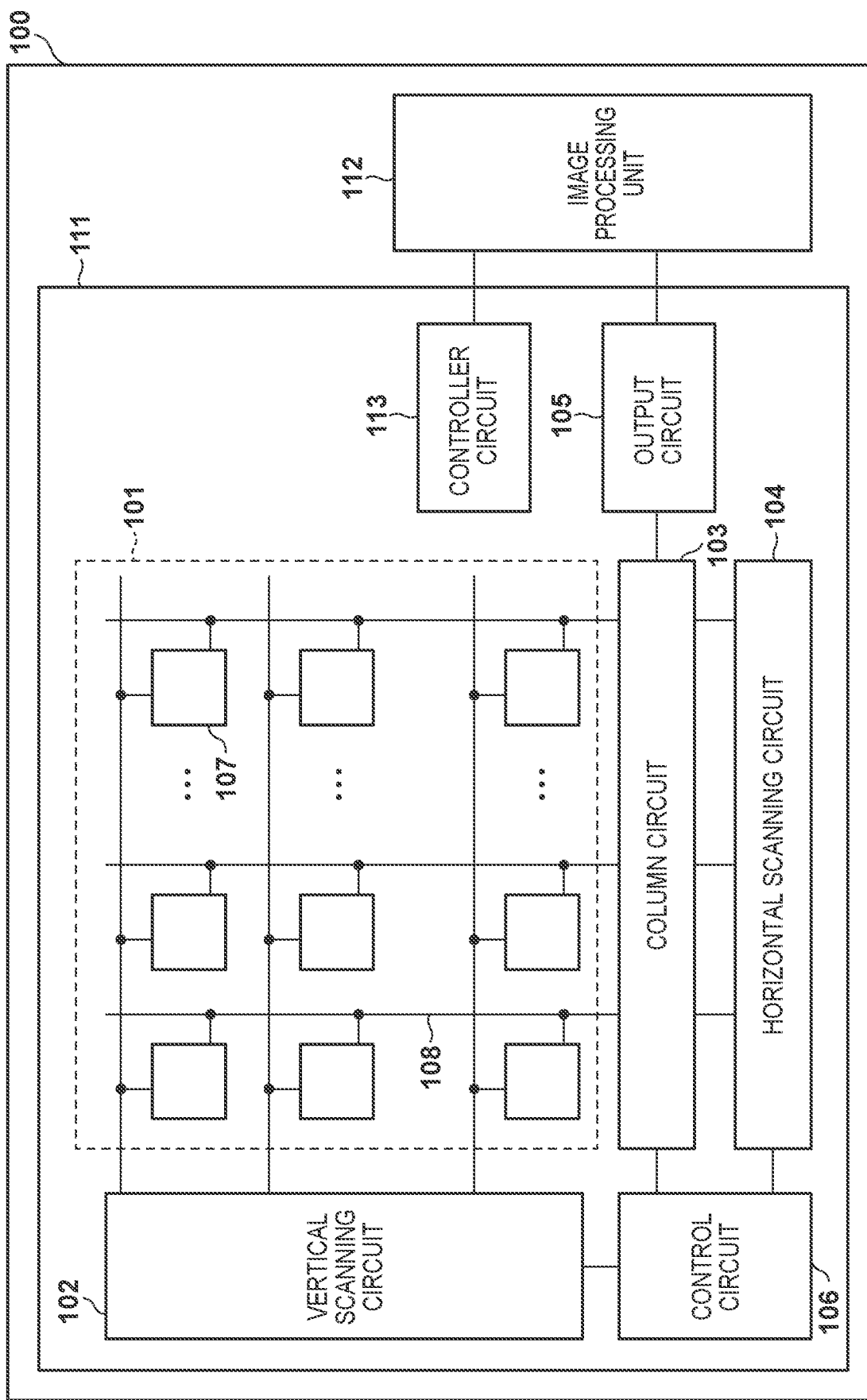
FIG. 1 is a block diagram illustrating a schematic configuration of an image capturing apparatus according to a first embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

In the following embodiments, the signal carriers are electrons, the signal accumulation layer is N-type, and transistors forming the circuits are N-type MOS transistors unless otherwise specified. However, the present invention is not limited to this, and it is also possible to use holes as the signal carriers, use P-type signal accumulation layer, and P-type MOS transistors.

Further, in the following embodiments, The GS sensor is assumed in which each pixel includes a photoelectric conversion unit, charge holding sections, transfer MOS transistors for transferring the charge of the photoelectric conversion unit to the charge holding sections, amplification MOS transistors for amplifying and outputting the charge, and transfer MOS transistors for transferring the charge held in the charge holding sections to the amplification MOS transistors.

First Embodiment

FIG. 1 is a block diagram showing a schematic configuration of an image capturing apparatus 100 according to the first embodiment. The image capturing apparatus 100 includes an image sensor (CMOS image sensor) 111 and an image processing unit 112. The image sensor 111 includes a pixel section 101, a vertical scanning circuit 102, a column circuit 103, a horizontal scanning circuit 104, an output circuit 105, a control circuit 106, and a controller circuit 113.

The controller circuit 113 is an interface unit to the image processing unit 112, communicates with the image processing unit 112 through serial communication, and receives control signals for the image sensor 111 from the image processing unit 112. The image processing unit 112, for example, obtains the luminance based on the pixel signal output from the image sensor 111, and determines exposure values such as the aperture and exposure period (charge accumulation period) based on the obtained luminance. Then, the determined exposure period is transmitted to the controller circuit 113 as a control signal, and the controller circuit 113 transmits the received control signal to the control circuit 106.

The pixel section 101 is a pixel array including a plurality of pixels 107 two-dimensionally arranged in a plurality of rows and a plurality of columns in a plan view of the substrate.

The vertical scanning circuit 102 controls the plurality of pixels 107 by supplying control signals to the plurality of transistors included in each pixel 107 to control on (conducting state) or off (non-conducting state) of these transistors.

A signal line 108 is provided in each column of the pixel section 101, and signals from the pixels 107 are output to the signal lines 108 of the respective columns in units of rows. The column circuit 103 includes amplifiers for amplifying the pixel signals output to the signal lines 108 and AD conversion circuits for converting the analog signals to digital signals. The horizontal scanning circuit 104 supplies a control signal to the switches of the column circuit 103 to turn on/off the switches and controls the pixel signals processed by the column circuit 103 in units of rows to be output to the output circuit 105.

The control circuit 106 controls the vertical scanning circuit 102, the column circuit 103, and the horizontal scanning circuit 104. At this time, the control circuit 106 can control the charge accumulation period of the pixels 107 by controlling the vertical scanning circuit 102 based on the control signals sent from the controller circuit 113, for example.

The output circuit 105 has a serializer function, converts the pixel signals from the column circuit 103 into a serial signal, and outputs it.

The pixel signal output from the output circuit 105 is input to the image processing unit 112, which performs development processing such as various adjustment/correction processing on the pixel signal, and outputs the developed pixel signal to the monitor, or records it on a recording medium. Furthermore, as described above, it is also possible to determine the exposure values and detect the focus state based on the pixel signal.

Figure 2:
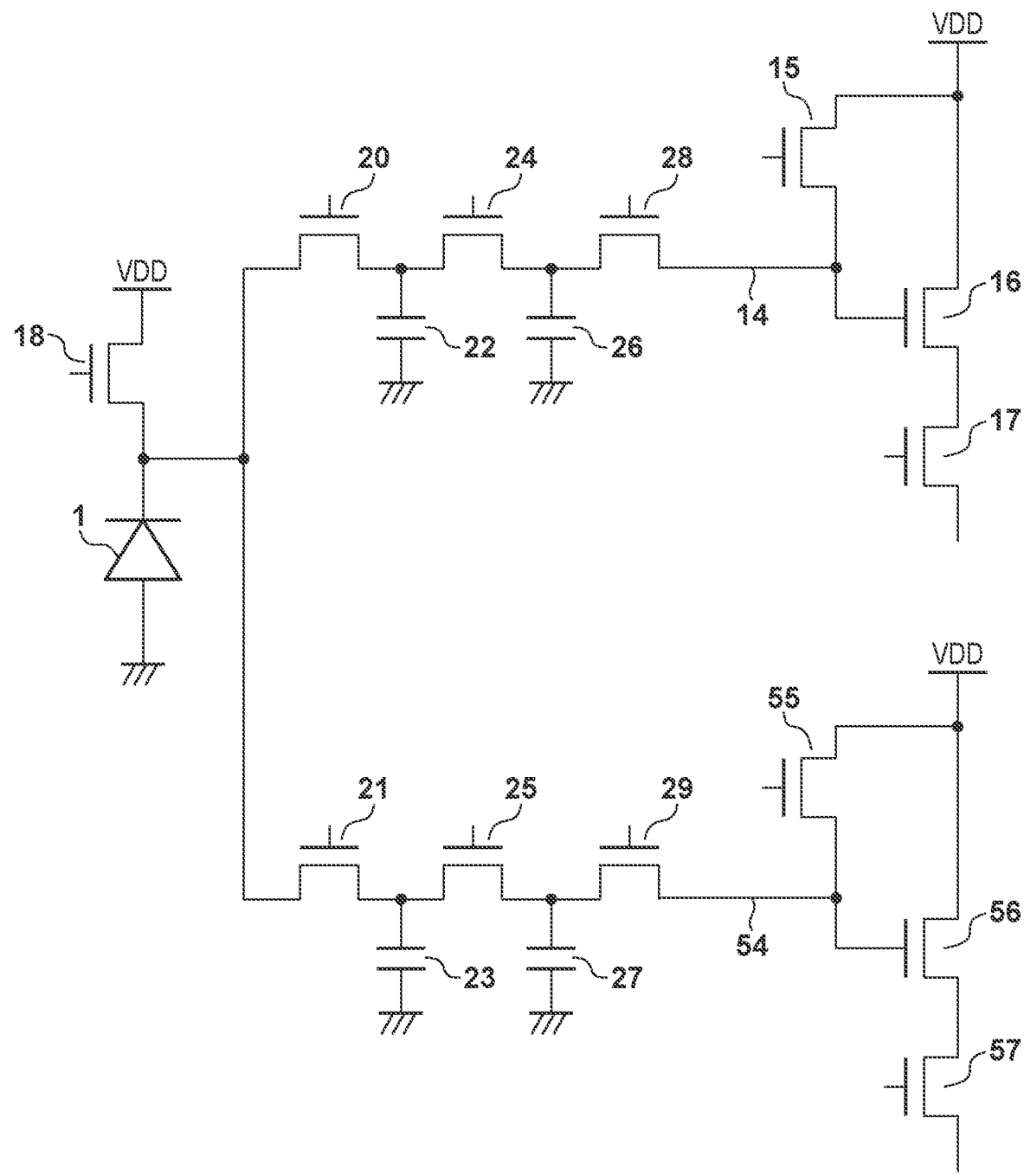
FIG. 2 is an equivalent circuit diagram illustrating the configuration of a pixel according to the first embodiment.

FIG. 2 is an equivalent circuit diagram showing the configuration of each pixel 107 in this embodiment.

In FIG. 2, a photodiode (PD) 1 shows an example of a photoelectric conversion unit. A transfer unit (GS1_L) 20, a transfer unit (GS2_L) 24, a transfer unit (GS1_S) 21, and a transfer unit (GS2_S) 25 are configured of, for example, MOS transistors.

GS1_L 20, when turned on, transfers the charge generated by PD 1 to a charge holding section (MEM1_L) 22. GS2_L 24, when turned on, transfers the charge held in MEM1_L 22 to a charge holding section (MEM2_L) 26. Furthermore, GS1_S 21, when turned on, transfers the charge generated by PD 1 to a charge holding section (MEM1_S) 23. GS2_S 25, when turned on, transfers the charge held in MEM1_S 23 to a charge holding section (MEM2_S) 27.

A transfer unit (TX_L) 28 and a transfer unit (TX_S) 29 are configured of, for example, MOS transistors.

For example, floating diffusion regions (FDs) arranged on a semiconductor substrate can be used as input nodes 14 and 54 of amplification units which will be described later.

TX_L 28, when turned on, transfers the charge held in MEM2_L 26 to FD 14. Further, TX_S 29, when turned on, transfers the charge held in MEM2_S 27 to FD 54.

Then, FD 14 and FD 54 temporarily hold charges transferred from MEM2_L 26 and MEM2_S 27 via TX_L 28 and TX_S 29, respectively.

A reset switch (RES) 15 and a reset switch (RES) 55 are configured by, for example, MOS transistors, and, when turned on, can reset FD 14 and FD 54 to the power supply voltage VDD.

An amplification unit 16 and an amplification unit 56 amplify voltages corresponding to the charges transferred to FD 14 and FD 54, respectively, and output the amplified voltages to the outside. Here, a source follower circuit (SF) using a MOS transistor is shown as an example, and a configuration in which the gate of the MOS transistor and the floating diffusion region are electrically connected can be used.

A selection unit (SEL) 17 and a selection unit (SEL) 57 are configured by, for example, MOS transistors, and when turned on, the corresponding pixel 107 is selected, and the voltage amplified by SF 16 or SF 56 is output to the signal line 108 connected to the pixel 107.

A discharge unit (OFG) 18 is configured to discharge unnecessary charges from PD 1, and may be configured by, for example, a MOS transistor. In this case, a semiconductor region having the same polarity as the charge and forming part of PD 1 is used as a source, and a semiconductor region (an overflow drain (OFD) region) to which power supply voltage VDD is applied is used as a drain.

Next, a method for controlling the image sensor 111 in this embodiment will be explained using FIGS. 3 and 4.

Figure 3:
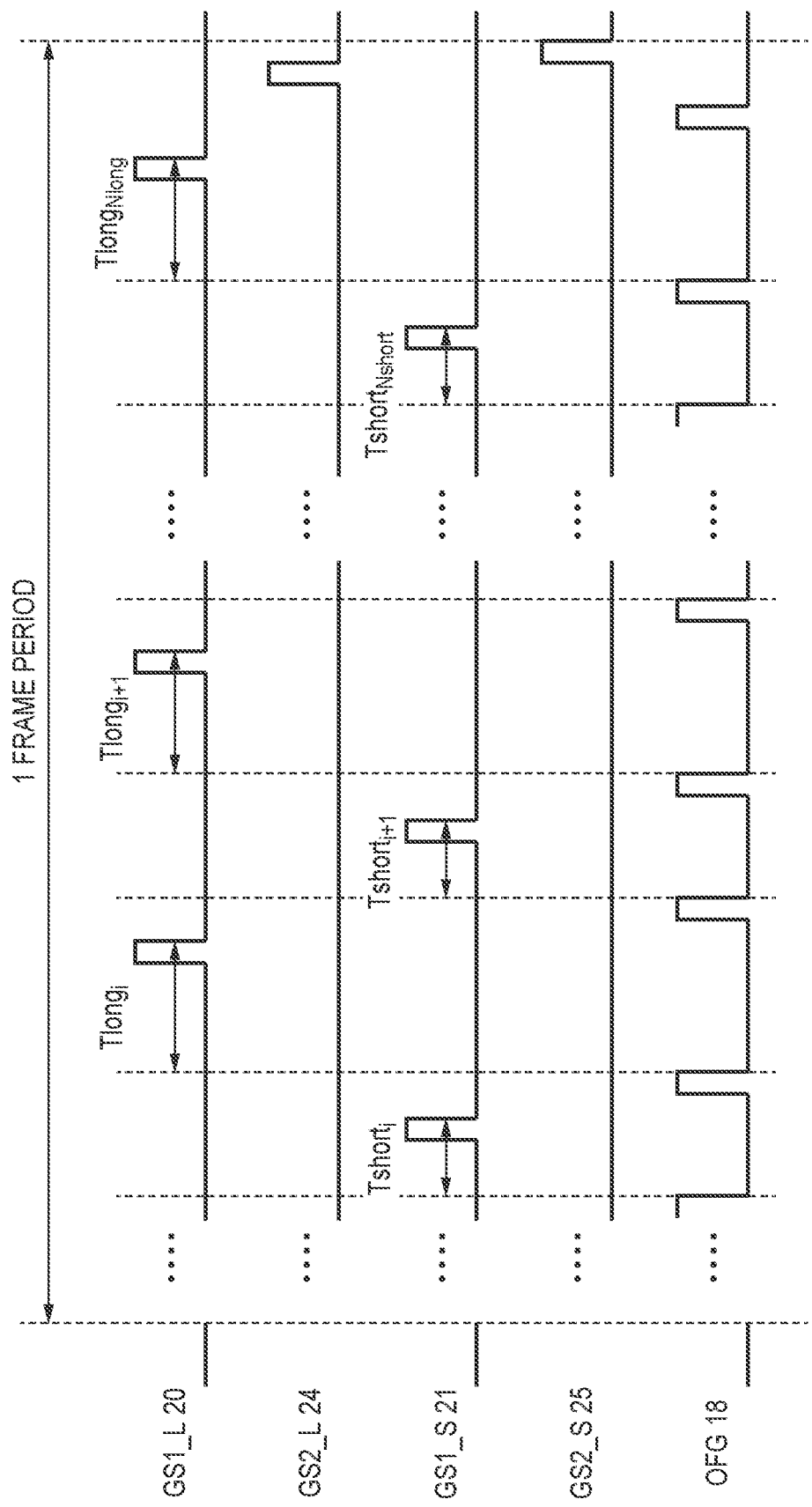
FIG. 3 is a timing chart illustrating charge accumulation control in the first embodiment.
Figure 4:
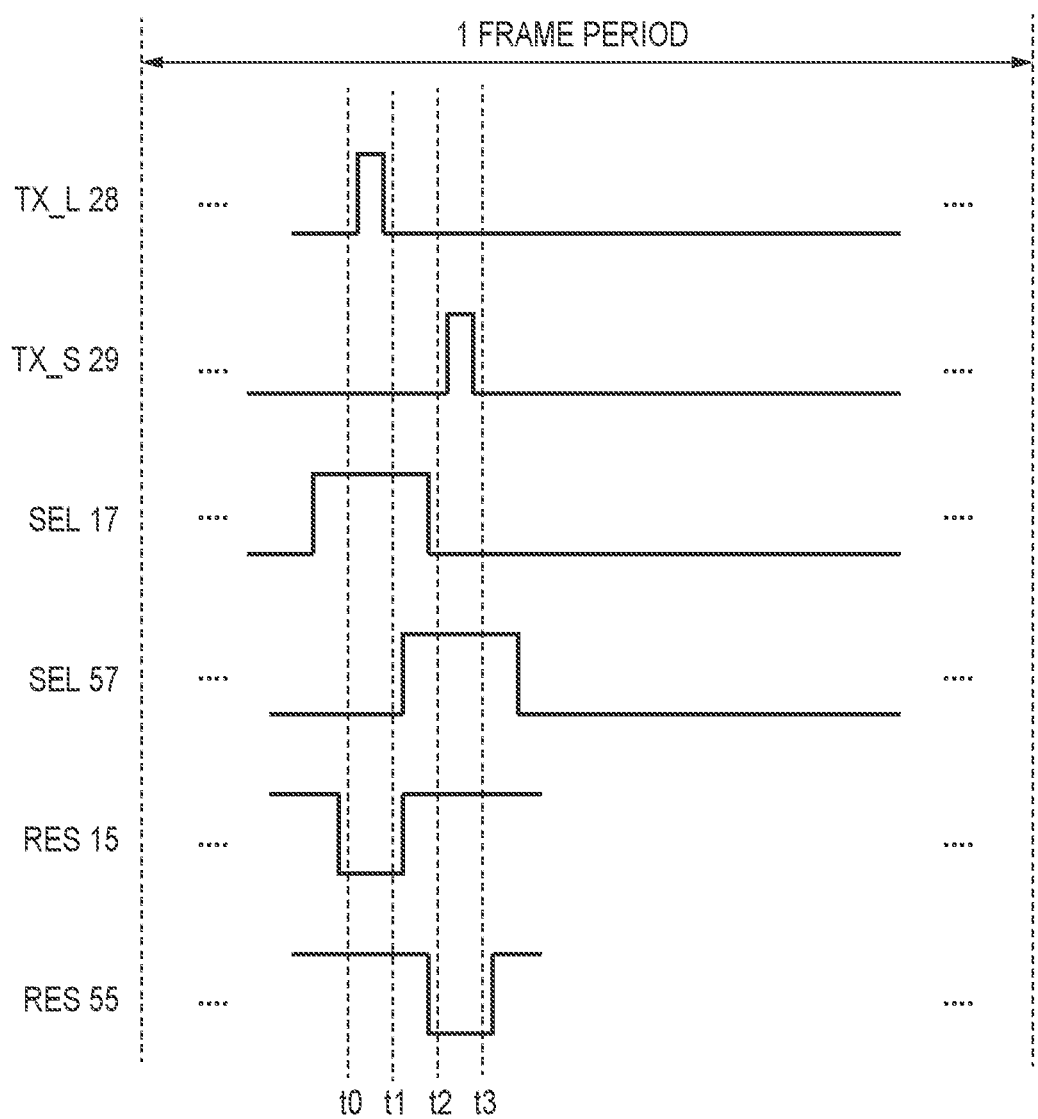
FIG. 4 is a timing chart illustrating signal readout control in the first embodiment.

FIGS. 3 and 4 show in chronological order the transition of the actuation pulses supplied to the control electrodes of each transistor shown in FIG. 2. FIG. 3 shows the actuation pulses related to exposure, and FIG. 4 shows the actuation pulses related to readout. When the actuation pulse shown in FIGS. 3 and 4 is High, each transistor is turned on.

Charge Accumulation Control

First, charge accumulation control will be explained.

During a certain period of one frame period, light incident on PD 1 is photoelectrically converted into charge, accumulated in PD 1, and transferred to MEM1_L 22 or MEM1_S 23 via GS1_L 20 or GS1_S 21. This charge transfer operation is performed a plurality of times during one frame period.

Tshort$_i$ shown in FIG. 3 indicates a charge accumulation period corresponding to the i-th charge transfer among charge transfers that are repeated a plurality of times, for example, Nshort times, during one frame period. Each charge accumulation period is a period from when a reset state of PD 1 is released by turning OFG 18 on and off, through a period when GS1_S 21 is turned on and the generated charge is transferred from PD 1 to MEM1_S 23, to when GS1_S 21 is turned off. Although PD 1 is reset using the OFG 18, if the configuration is such that no charge remains in PD 1 during transfer, the reset using the OFG 18 may be omitted. In that case, the charge accumulation period Tshort$_i$ corresponds to a period from when the immediately preceding charge transfer operation is completed to when GS1_S 21 is turned off.

A total charge accumulation period Tshort corresponding to the charge accumulated in the MEM1_S 23 in each frame is the period obtained by adding the charge accumulation periods Tshort$_i$ from i=1 to i=Nshort. Note that each charge accumulation period Tshort$_i$ may be the same or different between i=1 to i=Nshort, as long as the total charge accumulation period Tshort becomes a predetermined period.

Further, Tlong$_i$ shown in FIG. 3 indicates a charge accumulation period corresponding to the i-th charge transfer among charge transfers that are repeated a plurality of times, for example, Nlong times, during one frame period. Each charge accumulation period is a period from when a reset state of PD 1 is released by turning OFG 18 on and off, through a period when GS1_L 20 is turned on and the generated charge is transferred from PD 1 to MEM1_L 22, to when GS1_L 20 is turned off. Although PD 1 is reset using the OFG 18, if the configuration is such that no charge remains in PD 1 during transfer, the reset using the OFG 18 may be omitted. In that case, the charge accumulation period Tlong$_i$ corresponds to a period from when the immediately preceding charge transfer operation is completed to when GS1_L 20 is turned off.

A total charge accumulation period Tlong corresponding to the charge accumulated in MEM1_L 22 in each frame is the period obtained by adding the charge accumulation periods Tlong$_i$ from i=1 to i=Nlong. Note that each charge accumulation period Tlong$_i$ may be the same or different between i=1 to i=Nlong, as long as the total charge accumulation period Tlong becomes a predetermined period.

Then, when the total charge accumulation period Tshort and the total charge accumulation period Tlong reach respective predetermined periods, GS2_L 24 and GS2_L 25 are turned on, and the charges transferred to MEM1_L 22 and MEM1_S 23 are transferred to MEM2_L 26 and MEM2_S 27. By this time, the charges acquired in the previous frame and held in MEM2_L 26 and MEM2_S 27 are read out in all rows and emptied. By transferring charges to MEM2_L 26 and MEM2_S 27, MEM1_L 22 and MEM1_S 23 become empty, so that charges can be stored in the next frame. Note that in FIG. 3, the timings at which GS2_L 24 and GS2_S 25 are turned on are different, but they may be turned on at the same time.

Note that by making the total charge accumulation period Tlong and the total charge accumulation period Tshort different from each other, it is possible to obtain two types of images with different effective exposure amounts in the same frame. By adjusting the signal of one of these two types of images according to the charge accumulation periods and combining the images, one image with a high dynamic range can be obtained.

Furthermore, as mentioned above, by performing charge transfer from PD 1 a plurality of times during each frame, it is possible to suppress jitter between frames during moving image shooting, compared to transferring charge corresponding to the same charge accumulation period all at once. This is because the exposure period in one frame is dispersed evenly, and is particularly effective for shooting subjects that move at high speed within the screen or for shooting blinking light sources.

Signal Readout Control

Next, signal readout control will be described with reference to FIG. 4. Although not shown, the charges transferred to MEM2_Ls 26 and MEM2_Ss 27 in the immediately previous odd frame will be read out. Here, signal readout in an arbitrary row in a row-sequential reading manner will be explained.

First, SELs 17 are turned on so that the signals of FDs 14 of the pixels 107 in the n-th row can be read out. Then, RESs 15, which reset the FDs 14 when turned on, are turned off and the reset level voltages VRES of FDs 14 are read out (time t0). Next, TX_Ls 28 are turned on, the charges held in MEM2_Ls 26 are transferred to FDs 14, and the signal levels VSIG of FDs 14 are read out (time t1). The difference between these two signal levels, i.e., |VSIG−VRES|, is a physical quantity proportional to the amount of charge held in each MEM2_L 26.

Thereafter, SELs 57 are turned on so that the signals of FDs 54 of the pixels 107 in the n-th row can be read out. Then, RESs 55, which reset the FDs 54 when turned on, are turned off and the reset level voltages VRES of FDs 54 are read out (time t2). Next, TX_Ss 29 are turned on, the charges held in MEM2_Ss 27 are transferred to FDs 54, and the signal levels VSIG of FDs 54 are read out (time t3). The difference between these two signal levels, i.e., |VSIG−VRES|, is a physical quantity proportional to the amount of charge held in each MEM2_S 27.

By repeating the above-described operation row-by-row in all or the desired area, the charges held in MEM2_Ls 26 and MEM2_Ss 27 are read out as pixel signals.

As described above, by configuring each PD1 with two charge holding sections that accumulate signal charges to be transferred and two charge holding sections that hold charges until signal readout of the next frame, in all frames, images captured simultaneously with two different exposure values can be obtained.

Image Synthesis

Next, with reference to FIG. 5, synthesis processing for expanding the dynamic range of images captured with the charge accumulation period Tlong and the charge accumulation period Tshort will be described.

Figure 5:
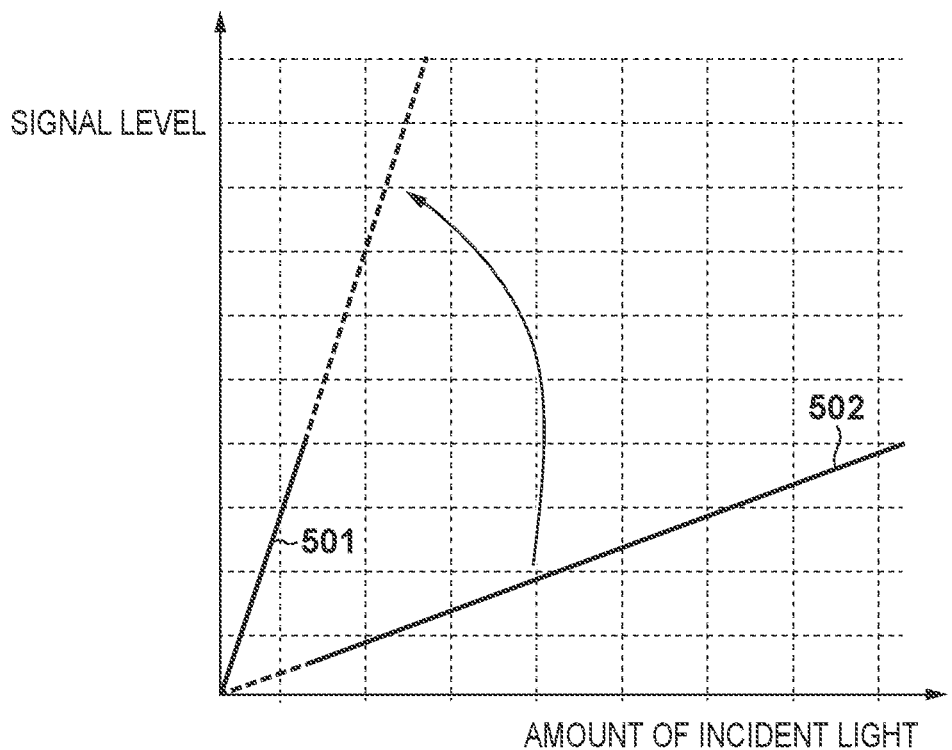
FIG. 5 is a diagram illustrating image synthesis processing for dynamic range expansion in the first embodiment.

In FIG. 5, graphs 501 and 502 indicate signal levels corresponding to the amount of incident light when signals corresponding to charges accumulated in the charge accumulation period Tlong and the charge accumulation period Tshort are read, respectively. Even with the same amount of incident light, as the charge accumulation period Tlong is longer than the charge accumulation period Tshort, so the signal level shown in graph 501 is higher than the signal level shown in graph 502. Note that in order to prevent the charge accumulated in PD 1 from exceeding the saturation level, the pixel signal obtained in the charge accumulation period Tlong is used for a low-luminance subject. On the other hand, the pixel signal obtained in the charge accumulation period Tshort is used for a high-luminance subject.

During dynamic range expansion synthesis, if the signal level is lower than a predetermined level, the signal of the charge accumulation period Tlong is used, and if the signal level is higher than the predetermined level, the signal of the charge accumulation period Tshort is used. Note that upon synthesis, in order to correct the time difference between the charge accumulation period Tlong and the charge accumulation period Tshort, the ratio between the charge accumulation period Tlong and the charge accumulation period Tshort is used for correction, and then the synthesis is performed. For example, if the ratio between the charge accumulation period Tlong and the charge accumulation period Tshort is 4:1, the signal of the charge accumulation period Tshort is multiplied by 4 and then synthesized with the signal of the charge accumulation period Tlong.

By performing the synthesis in this manner, it becomes possible to expand the dynamic range without being limited by the saturation level of charge accumulation in PD 1.

Method for Correcting Variation in FD Capacitance Variations

Next, a method for correcting variation in FD capacitance will be explained.

As described above, the charge held in MEM2_L 26 is read out to FD 14 via TX_L 28, and the charge held in MEM2_S 27 is read out to FD 54 via TX_S 29. Although FD 14 and FD 54 are designed to have the same capacitance, in reality they are not completely the same due to the influence of manufacturing variations, and variations in capacitance occur.

Figure 6:
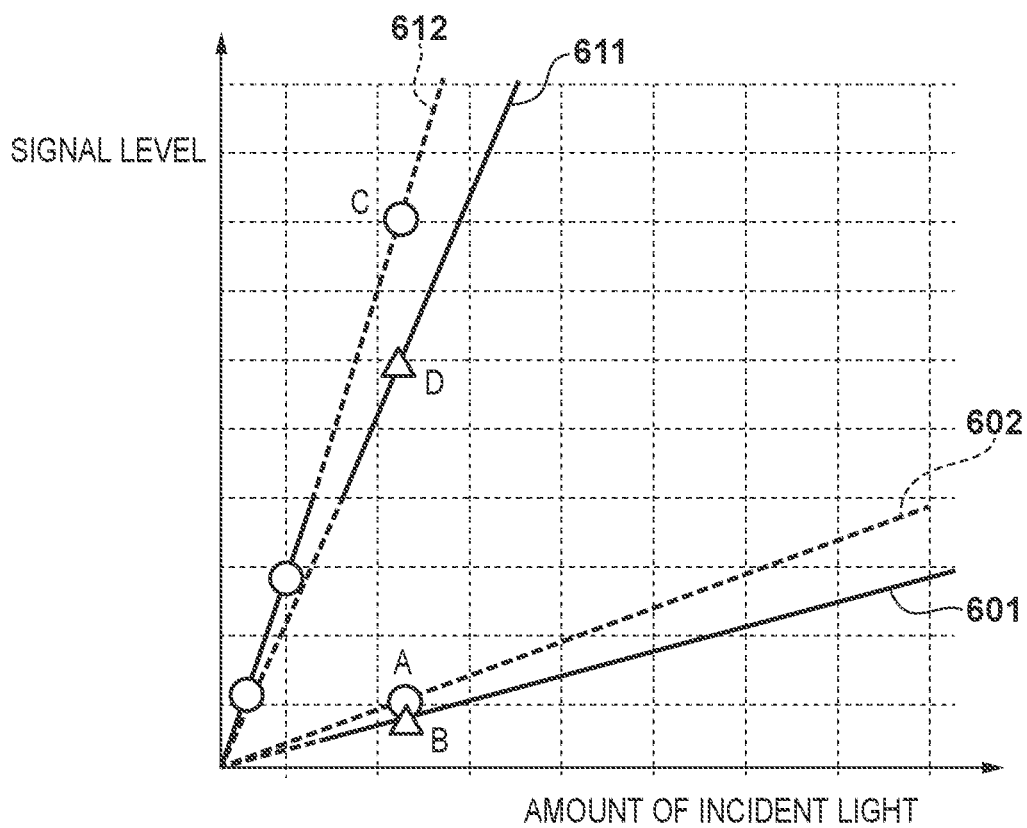
FIG. 6 is a diagram for explaining a method of correcting variations in FD capacitance according to the first embodiment.

FIG. 6 is a diagram showing the relationship between the amount of incident light and the signal level of the signal corresponding to the charge accumulation period Tshort. In FIG. 6, a graph 601 represents an example of the signal level of a signal corresponding to the charge accumulation period Tshort and read out via FD 54, and a graph 602 represents an ideal signal level of a signal corresponding to the charge accumulation period Tshort and read out via FD 14 in a case where there is no variation in capacitance between FD 14 and FD 54. Further, a graph 611 represents an example of a signal level obtained by converting the graph 601 according to the ratio of time between the charge accumulation period Tlong and the charge accumulation period Tshort. A graph 612 represents an example of a signal level of a signal corresponding to the charge accumulation period Tlong and read out via FD 14.

If the capacitance of FD 14 used for the charge accumulation period Tlong and the capacitance of FD 54 used for the charge accumulation period Tshort are the same, the signal level A becomes the signal level C if corrected by the ratio of the charge accumulation periods. As shown, the graph 612 matches a graph obtained by converting the graph 602 according to the ratio of the charge accumulation period Tlong to the charge accumulation period Tshort.

If there is a difference in the capacitance between FD 54 and FD 14, as shown in graphs 611 and 612, if the signal obtained with the charge accumulation period Tshort is corrected with the ratio of the charge accumulation periods, the difference between signal levels occurs. In the example of FIG. 6, the signal level B obtained with the charge accumulation period Tshort under a given amount of incident light becomes the signal level D, which is not the same as the signal level C obtained with the charge accumulation period Tlong under the given amount of incident light. The difference between the signal level C and the signal level D appears as a luminance difference between pixels in a synthesized image. Therefore, in this embodiment, this difference in signal level is corrected.

In order to correct this signal level difference, in this embodiment, information on correction values for correcting the difference is acquired in advance. Specifically, it is conceivable to acquire the correction data at the time of manufacturing the image capturing apparatus 100. By irradiating the entire surface of the image sensor 111 evenly with light using a light source capable emitting a constant amount of light, and comparing the signal levels of the signals respectively obtained with the charge accumulation periods Tlong and Tshort, it is possible to obtain correction value that makes the signal levels the same. The obtained correction value for each pixel 107 is stored in a storage unit (not shown) included in the image capturing apparatus 100.

First, two signal levels corresponding to two arbitrary amounts of incident light are obtained with the charge accumulation period Tlong, and a signal level C corresponding to a predetermined amount of incident light is calculated from the ratio of the amounts of incident light. Next, the signal level B corresponding to the predetermined amount of incident light obtained with the charge accumulation period Tshort is corrected using the ratio of the charge accumulation period Tlong to the charge accumulation period Tshort to obtain the signal level D. A value that can cancel out the difference between the signal level C and the signal level D so that the signal level C and the signal level D have the same value is the correction value. In this way, a correction value is obtained for each pixel.

In this embodiment, using this correction values, the image processing unit 112 performs correction by amplifying the signal level. As the correction is performed by the image processing unit 112, the correction is digital signal processing. The ratio between the signal level C and the signal level D in each pixel for the same amount of incident light is obtained in advance, and the signal level obtained with either the charge accumulation period Tlong or the charge accumulation period Tshort is corrected.

Here, in a case where the correction value is for correcting the difference between the signal level C and the signal level D shown in FIG. 6, a case will be described in which the ratio of the signal level C to the signal level D in an arbitrary pixel 107 under the same amount of incident light is 1.1:1 as an example. If the signal level C is higher than the signal level D at a ratio of 1.1:1, correction is performed by multiplying the signal level corresponding to the charge accumulation period Tshort by 1.1.

Further, for example, if the ratio of the signal level C to the signal level D output from an arbitrary pixel 107 is 0.9:1, correction is performed by multiplying the signal value corresponding to the charge accumulation period Tshort by 0.9.

In this way, by correcting the signal of each pixel obtained with the charge accumulation period Tshort based on the signal level difference, the signal can be corrected to the same level as the signal of each pixel obtained with the charge accumulation period Tlong.

Note that in the above example, a case has been described in which the signal obtained with the charge accumulation period Tshort is corrected, but in a case of correcting the signal obtained with the charge accumulation period Tlong, the correction value can be obtained in the same manner. That is, if the signal level of the signal level C to the signal level D is, for example, 1.1:1, the signal obtained with the charge accumulation period Tlong needs to be multiplied by 1/1.1, and if 0.9:1, the signal obtained with the charge accumulation period Tlong needs to be multiplied by 1/0.9

Figure 7:
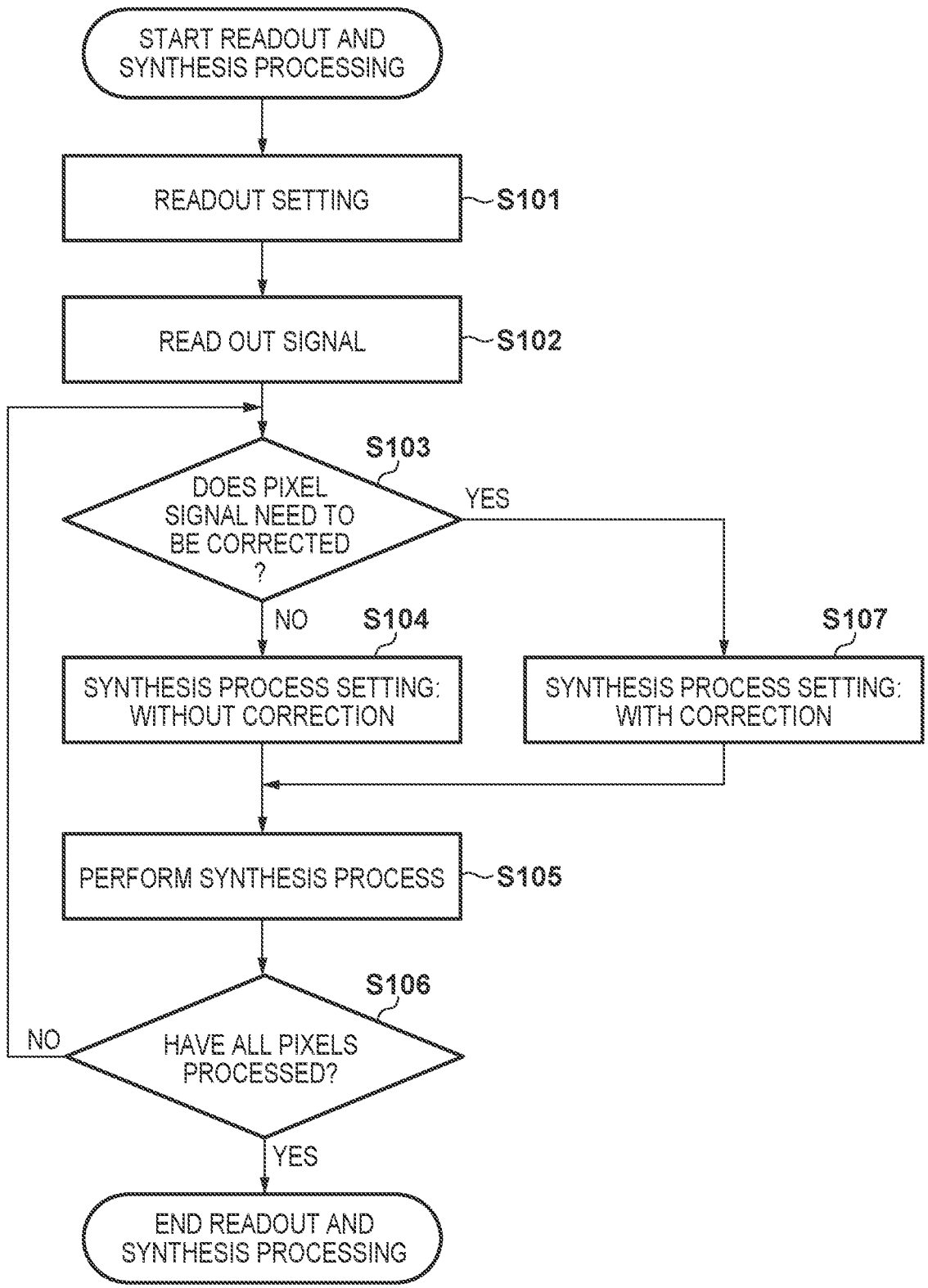
FIG. 7 is a flowchart illustrating processing in the first embodiment.

Next, using FIG. 7, readout and synthesis processing of one frame worth of signal will be described.

When the process of reading out signal from the image sensor 111 is started, in step S101, readout settings for the image sensor 111 are made. Next, in step S102, a signal from the image sensor 111 is sequentially read out row by row based on the settings. The read-out signal is output to the image processing unit 112 for each pixel 107 via the output circuit 105.

Next, in step S103, the image processing unit 112 determines for each pixel 107 whether signal correction is necessary in the synthesis process for expanding the dynamic range. Here, the determination is made based on whether or not a correction value is stored in advance for the pixel 107 that outputs the input signal. If it is determined that signal correction is not necessary, in step S104, a synthesis process for expanding the dynamic range without correction is set for the signals corresponding to the charge accumulation period Tlong and the charge accumulation period Tshort.

On the other hand, if it is determined in step S103 that signal correction is necessary, the process proceeds to step S107, and a synthesis process for expanding the dynamic range with correction involving correction of the signal corresponding to either the charge accumulation period Tshort or the charge accumulation period Tlong is set. Either of a signal corresponding to the charge accumulation period Tshort or a signal corresponding to the charge accumulation period Tlong may be corrected, but which of the signals is corrected is determined based on on which of the signal corresponding to the charge accumulation period Tshort and the signal corresponding to the charge accumulation period Tlong, the pre-stored correction value is based. In the example described with reference to FIG. 6, the setting is made so that the signal obtained with the charge accumulation period Tshort is corrected.

Next, in step S105, based on the setting of the synthesis process, a synthesis process is performed to expand the dynamic range of the pixel signals with or without correction. Then, in step S106, it is determined whether processing has been completed for all pixels 107 included in one frame or a predetermined area, and if there is any unprocessed pixel 107, the process returns to step S103 and the aforesaid processes are repeated, and if processing has been completed for all pixels 107, the processing ends.

As described above, according to the first embodiment, the difference in signal level between pixels can be corrected by correcting the signal of the correction target signal. Thereby, images with a high dynamic range can be acquired in consecutive frames while suppressing the variation in luminance within each image.

Furthermore, in addition to correcting the influence of variations in FD capacitance according to this embodiment, since the signal levels corresponding to a predetermined amount of incident light and output from each pixel are compared and the signal levels are corrected to become the same level, variations in pixels other than FD capacitance can also be corrected.

Further, in the above example, the image processing unit 112 in the image capturing apparatus 100 corrects variations in FD capacitance, however the present invention is not limited to this. For example, image data before dynamic range expansion processing may be output from the image capturing apparatus 100 to an external information processing apparatus, such as a PC, and the dynamic range expansion processing including the above-mentioned correction processing may be performed in the external information processing apparatus.

Modification

Figure 8:
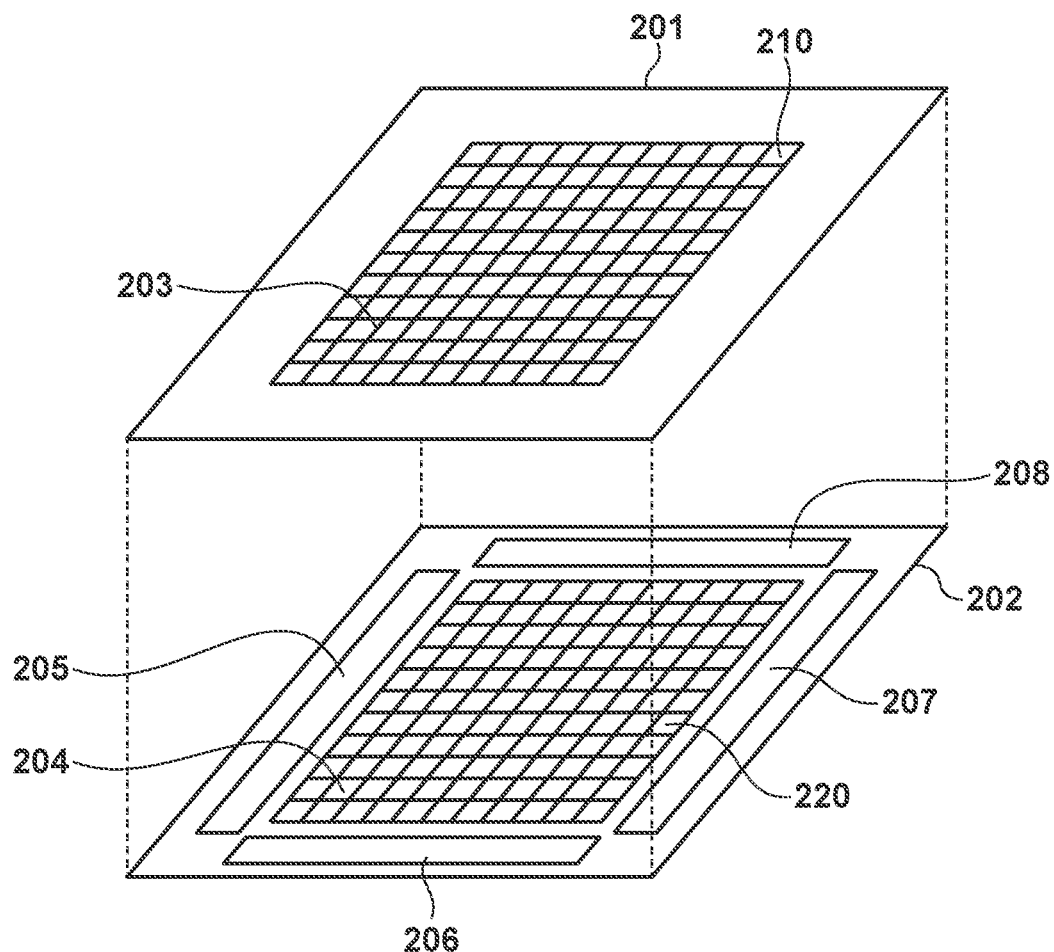
FIG. 8 is a block diagram illustrating a schematic configuration of an image capturing apparatus according to a modification of the first embodiment.

FIG. 8 is a block diagram showing another schematic configuration of the image capturing apparatus 100 according to a modification of the first embodiment, and the image capturing apparatus 100 has a stacked structure in which a pixel area substrate 201 and a signal processing circuit board 202 are stacked. The wiring on the substrates are electrically connected using silicon through electrodes or the like. The pixel area substrate 201 includes a pixel area 203 and the signal processing circuit board 202 includes an image processing circuit area 204, and peripheral circuit areas 205, 206, 207 and 208. The image processing circuit area 204 corresponds to the image processing unit 112.

Further, in the pixel area 203 on the pixel area substrate 201, a plurality of light receiving regions 210 are arranged in a matrix. Further, the signal processing circuit board 202 is provided with a plurality of signal processing units 220 corresponding to the plurality of light receiving regions 210.

Figure 9:
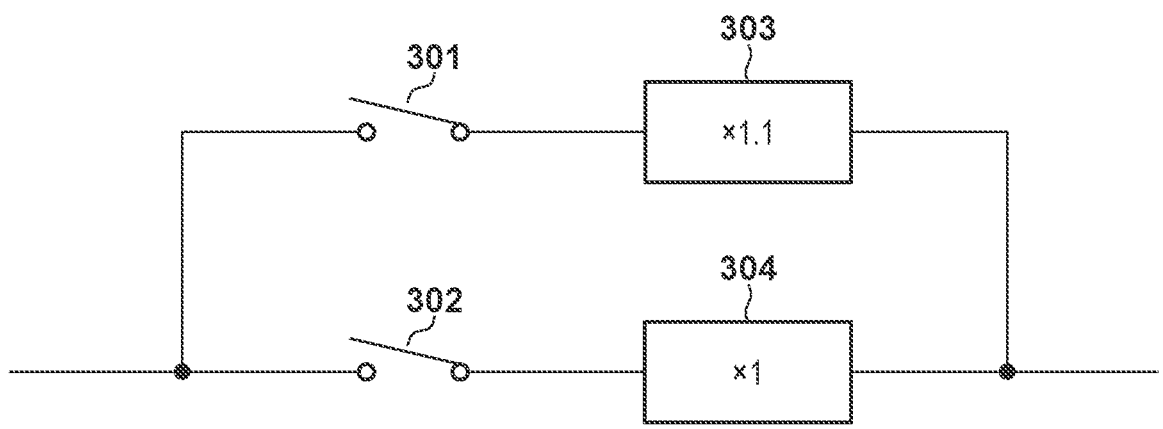
FIG. 9 is a block diagram illustrating an example of a configuration of an amplification unit of an image processing unit according to the modification of the first embodiment.

FIG. 9 shows the configuration of an amplification unit 300 included in each signal processing unit 220. In this modification, the amplification unit 300 is used to correct the signal level difference between pixels. As an example, a case will be described in which the ratio of signal level C to signal level D at an arbitrary pixel 107 for the same amount of incident light is 1.1:1.

In this case, SW 301 is turned on for a signal obtained with the charge accumulation period Tshort to amplify the signal by 1.1 by a gain circuit 303, and SW 302 is turned on for a signal obtained with the charge accumulation period Tlong to amplify the signal by 1.0 by a gain circuit 304, or the signal is output as is without being amplified. By performing the correction in this way and changing the amplification factor according to the correction value for the signal obtained with the charge accumulation period Tshort, it is possible to correct the signal level corresponding to the charge accumulation period Tshort to the same level as the signal level of the signal obtained with the charge accumulation period Tlong.

Further, for example, if the ratio of the signal level C to the signal level D output from a certain pixel 107 is 0.9:1, the gain circuit 303 is adjusted to multiply the signal obtained with the charge accumulation period Tshort by 0.9.

In this way, by setting the value of the gain circuit 303 of the amplification unit 300 in advance according to the ratio between the signal level C and the signal level D in each pixel, the signal difference due to the difference in capacitance between the FD 14 and the FD 54 can be reduced.

As described above, according to the modification, the same effects as in the first embodiment can be obtained using an image capturing apparatus having a stacked structure.

Second Embodiment

Next, a second embodiment of the present invention will be described.

In the first embodiment described above, a case has been described in which signal level difference due to variations in capacitance between the FD 54 and the FD 14 is corrected by signal processing. In contrast, in the second embodiment, a method of correcting the signal level difference by changing the charge accumulation period will be described.

Figure 10:
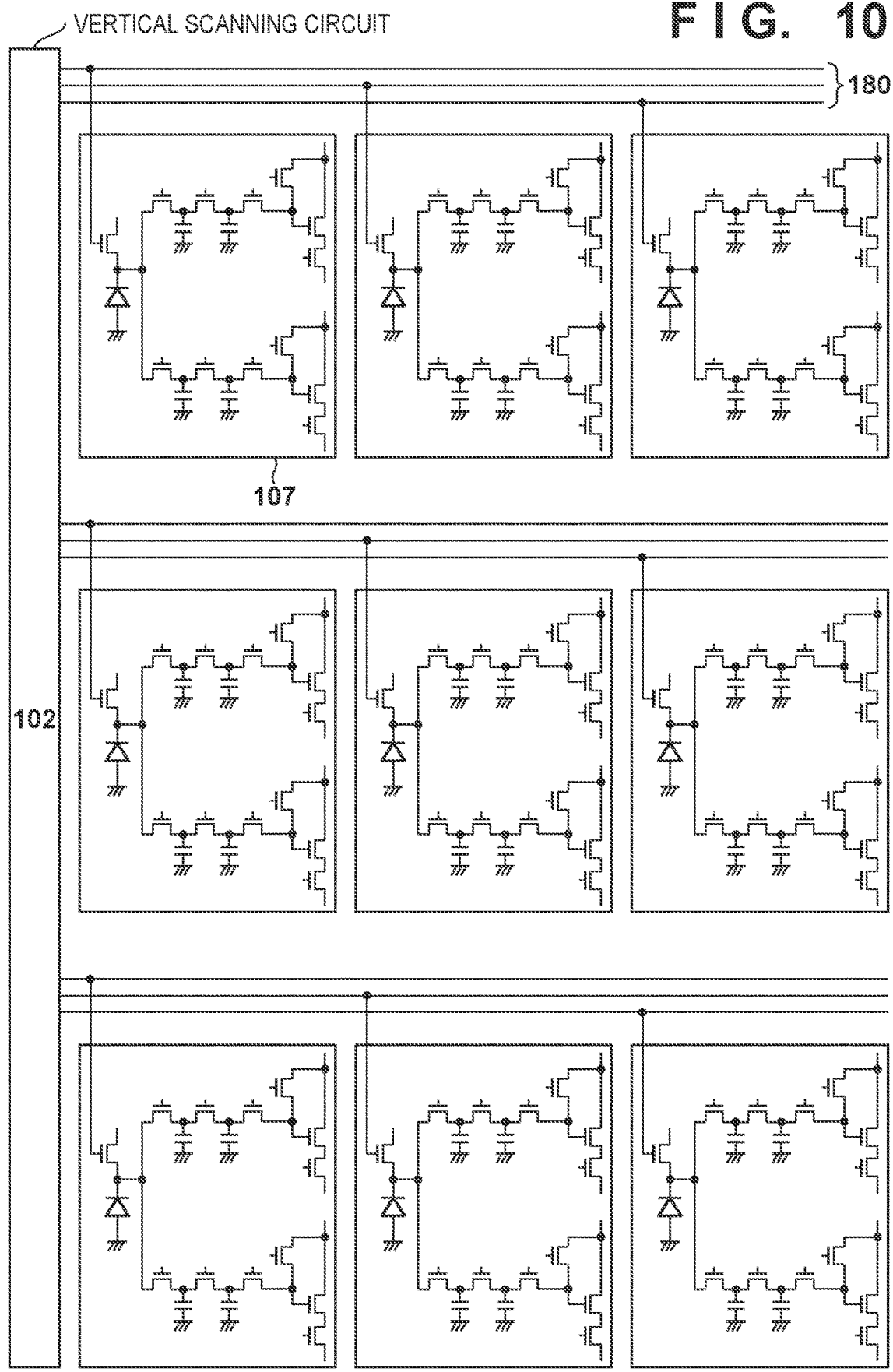
FIG. 10 is an equivalent circuit diagram illustrating a configuration and wiring of a part of pixels according to a second embodiment.

Note that the configuration of the image capturing apparatus 100 in the second embodiment is the same as that shown in FIG. 1, so the description thereof will be omitted here. However, the vertical scanning circuit 102 in this embodiment differs from that in the first embodiment in that the on/off timings of OFG 18 of each pixel 107 can be controlled for each pixel 107. FIG. 10 shows an equivalent circuit diagram including wiring 180 to OFGs 18 for 3×3 pixels. The vertical scanning circuit 102 can control the charge accumulation period of each pixel by controlling the on/off timings of OFG 18 via the wiring 180. Note that the wiring 180 includes the same number of signal lines as the number of pixels included in each row.

Figure 11:
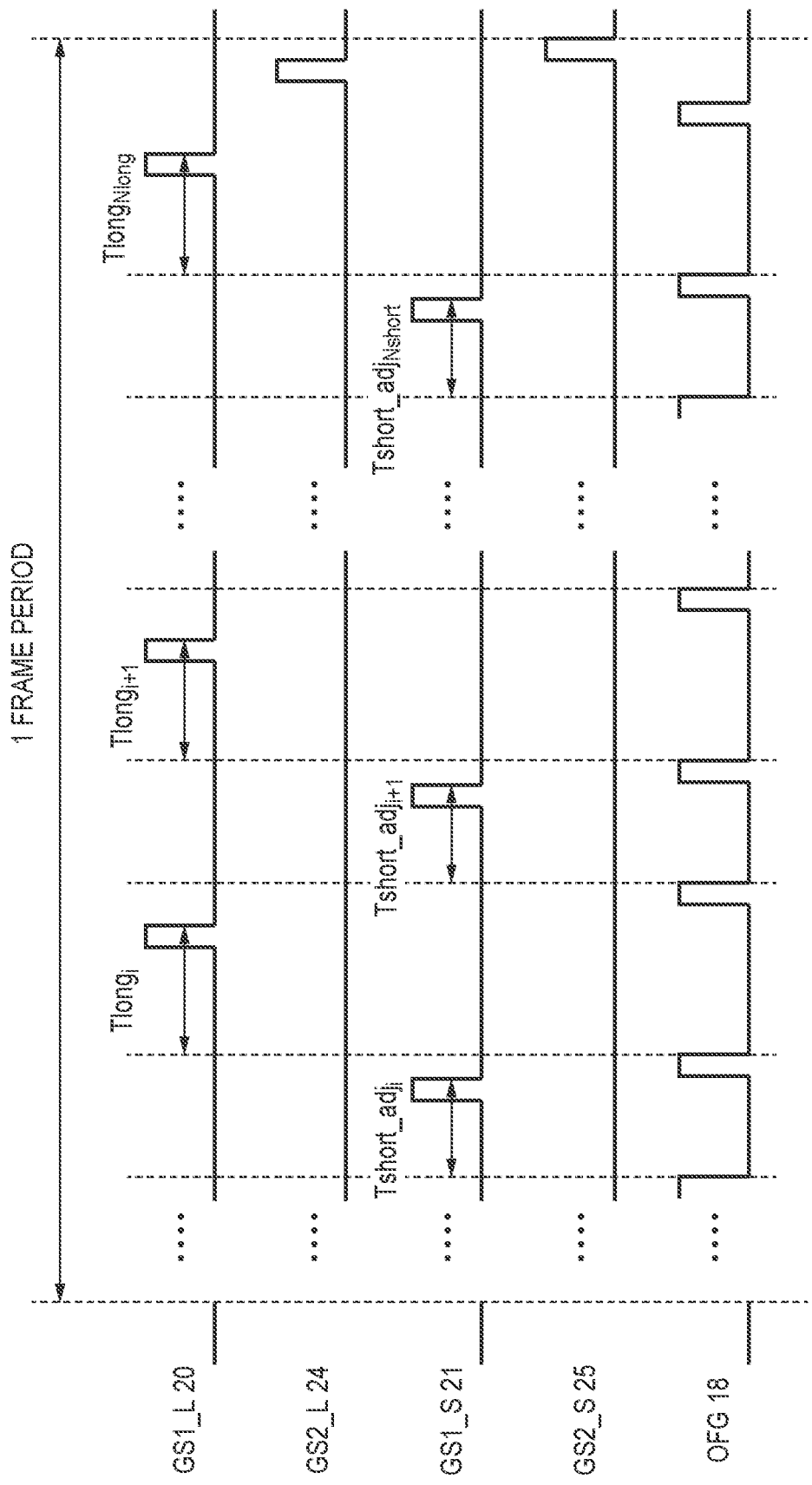
FIG. 11 is a timing chart showing a charge accumulation period of a pixel according to the second embodiment.

FIG. 11 shows a control pattern in a case where the charge accumulation period Tshort is lengthened, and by changing the timing at which OFG 18 is turned off (timing at which charge accumulation starts), the charge accumulation period T short is lengthened.

As an example, as shown in FIG. 6, when the ratio of the signal level C to the signal level D for the same amount of incident light is 1.1:1, in this embodiment, the correction is made by lengthening the charge accumulation period Tshort by 1.1 times.

Figure 12:
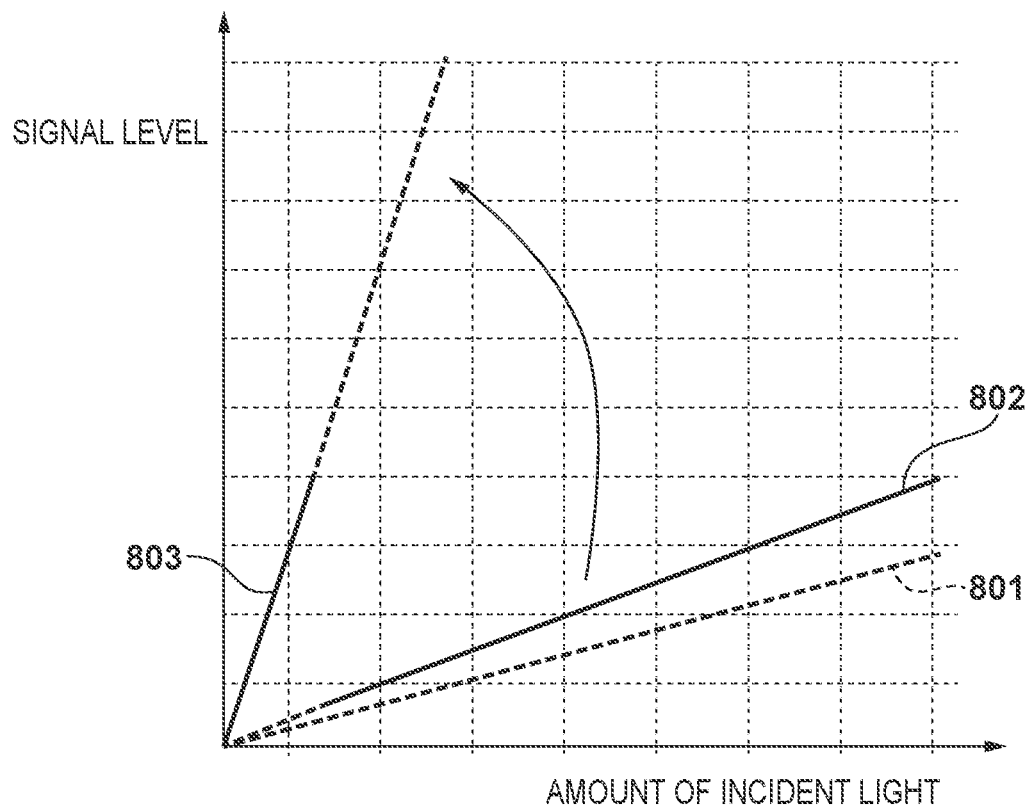
FIG. 12 is a diagram illustrating pixel signal levels according to the second embodiment.

The charge accumulation period Tshort_adj is a period from when a reset state of PD 1 is released by turning OFG 18 on and off, through a period when GS1_S 21 is turned on and the generated charge is transferred from PD 1 to MEM1_S 23, to when GS1_S 21 is turned off. This charge accumulation period Tshort_adj is set to be 1.1 times the charge accumulation period Tshort. As a result, as shown in FIG. 12, if the signal level of the signal obtained with the charge accumulation period Tshort is represented by a graph 801, the signal level of the signal obtained with the charge accumulation period Tshort_adj becomes as shown by a graph 802. By converting the graph 802 using the ratio between the charge accumulation period Tlong and the charge accumulation period Tshort, it is possible to make a graph equivalent to the graph 803 corresponding to the signal level of the signal obtained with the charge accumulation period Tlong.

Further, for example, if the ratio of signal levels output from an arbitrary pixel 107 is 0.9:1, the charge accumulation period Tshort_adj is adjusted to be 0.9 times the charge accumulation period Tshort.

In this way, by setting the charge accumulation period described above in advance according to the ratio of the signal levels obtained with the charge accumulation period Tlong and the charge accumulation period Tshort in each pixel, it is possible to reduce signal differences due to the difference in capacitance between the FD14 and FD54.

Figure 13:
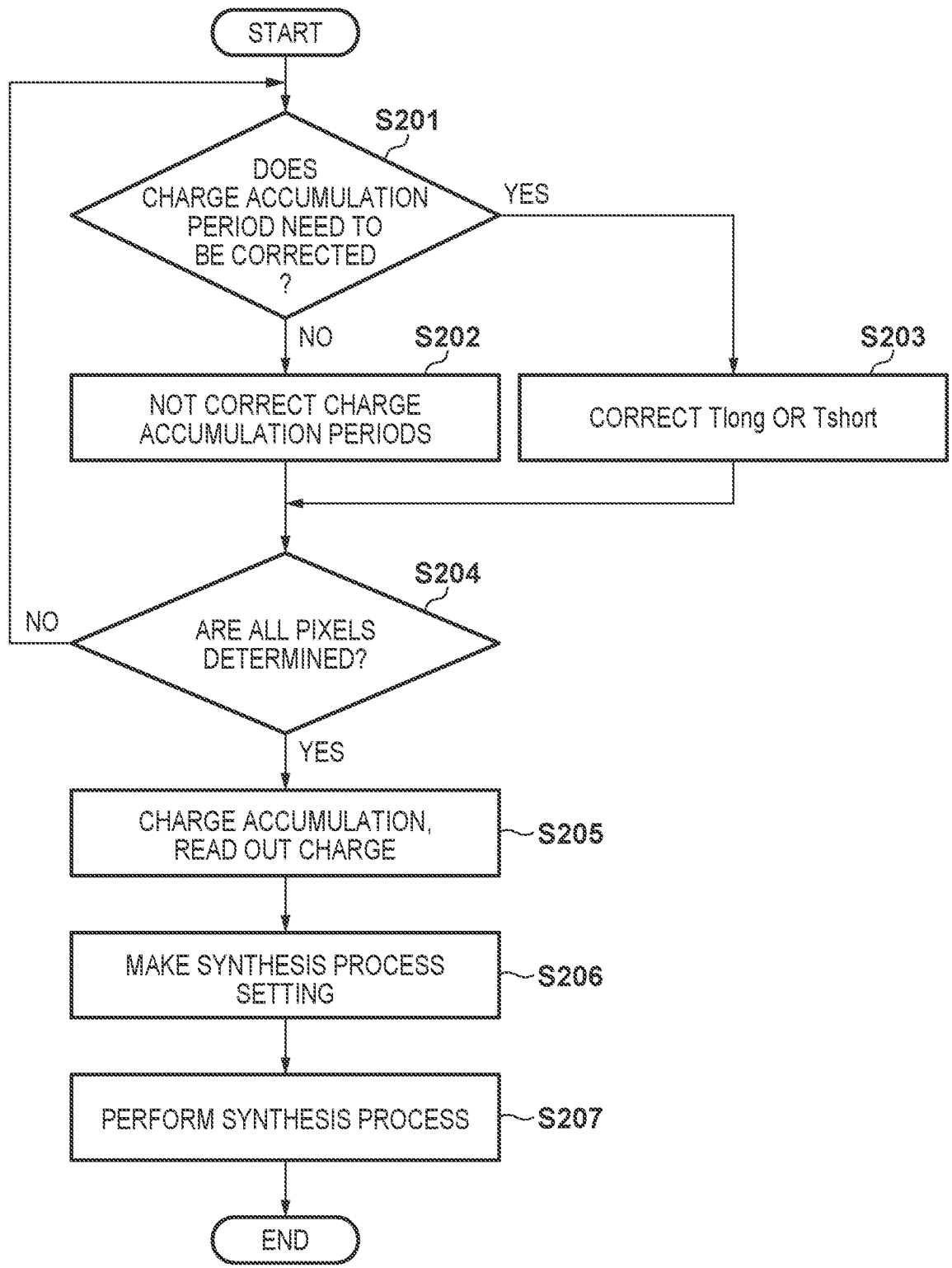
FIG. 13 is a flowchart illustrating processing in the second embodiment.

Next, a series of processing from charge accumulation to signal synthesis will be explained using FIG. 13.

When the processing in the image sensor 111 is started, in step S201, it is determined for each pixel whether or not correction of the charge accumulation period is necessary. Here, the determination is made based on whether or not a correction value is stored in advance for the pixel 107 that outputs the input signal. If it is determined that there is no need to correct the charge accumulation period, the process proceeds to step S202, where the charge accumulation period Tshort and the charge accumulation period Tlong are set as they are.

On the other hand, if it is determined in step S201 that correction of the charge accumulation period is necessary, the process proceeds to step S203 and the length of either the charge accumulation period Tshort or the charge accumulation period Tlong is adjusted. Either the charge accumulation period Tshort or the charge accumulation period Tlong may be corrected, but which of the charge accumulation periods is corrected is determined based on on which of the signal corresponding to the charge accumulation period Tshort and the signal corresponding to the charge accumulation period Tlong, the pre-stored correction value is based. In the example described with reference to FIG. 6, the charge accumulation period Tshort is corrected.

Then, in step S204, it is determined whether correction of the charge accumulation period has been completed for all pixels 107 included in one frame or a predetermined area, and if there is any unprocessed pixel 107, the process returns to step S201 and the aforesaid processes are repeated, and if all pixels 107 have been processed, the process advances to step S205.

In step S205, charges are accumulated and read out with the charge accumulation period Tlong and the charge accumulation period Tshort or Tshort_adj set in step S202 or S203.

Then, in step S206, the image processing unit 112 makes dynamic range expansion processing setting including signal adjustment based on the ratio between the charge accumulation period Tlong and the charge accumulation period Tshort. At this time, the setting is made based on the ratio between the charge accumulation period Tlong and the charge accumulation period Tshort before adjustment. Next, in step S207, a synthesis process for expanding the dynamic range of pixel signals is performed based on the setting, and processing for one frame is completed.

As described above, according to the second embodiment, the difference in signal level between pixels can be corrected by correcting the charge accumulation period of the correction target pixel. Thereby, images with a high dynamic range can be acquired in consecutive frames while suppressing the variation in luminance within each image.

Note that in the above example, a case has been described in which the charge accumulation period is controlled by controlling the timing at which OFG 18 is turned off. Alternatively, the charge accumulation period may be controlled by changing the timing of charge transfer from PD 1 to MEM1_L 22 or from PD 1 to MEM1_S 23 by GS1_L 20 and GS1_S 21, respectively.

Alternatively, the image capturing apparatus 100 may have a stacked structure, and an actuation circuit for actuating each pixel 107 may be provided for each pixel.

Third Embodiment

Next, a third embodiment of the present invention will be described.

In the third embodiment, a case will be described in which the luminance difference between pixels is reduced by controlling the amplification factor when amplifying signals with the amplifiers of the column circuit 103. Note that the configuration of the image capturing apparatus 100, the method of controlling charge accumulation, and the readout control are the same as those described in the first embodiment, so description thereof will be omitted here.

Figure 14:
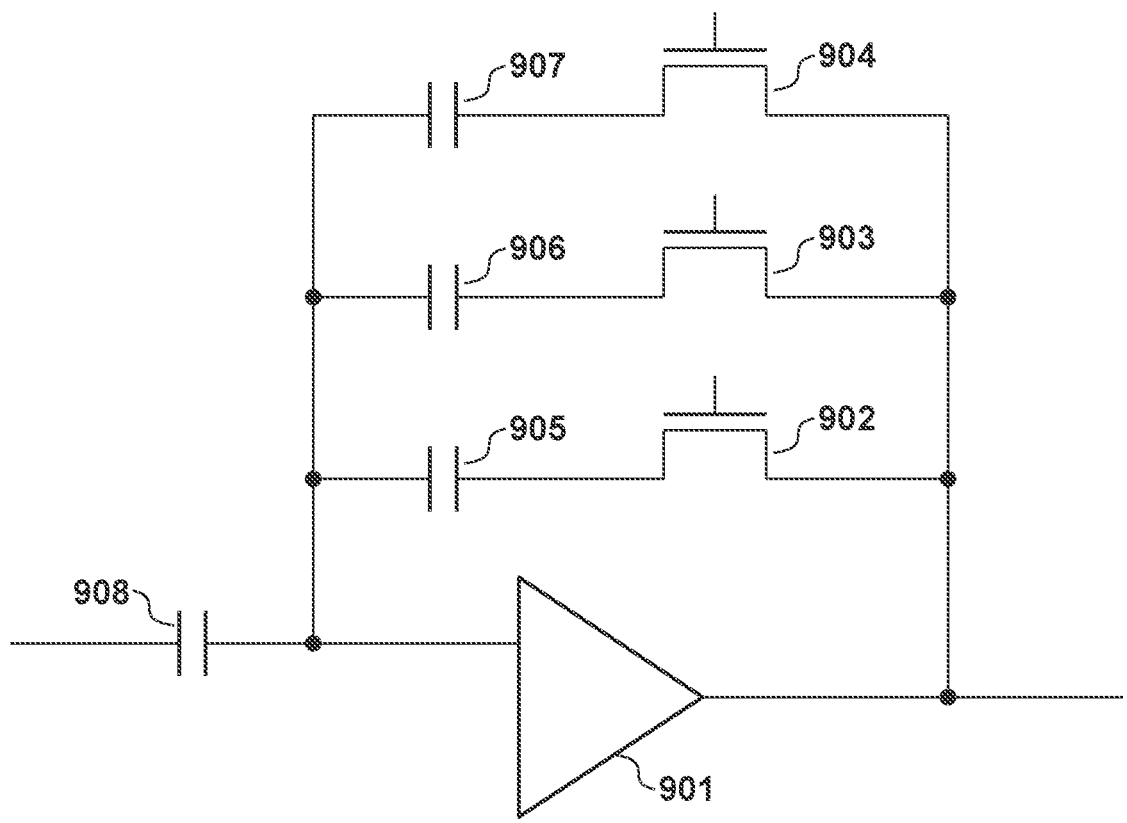
FIG. 14 is a circuit diagram showing an example of a configuration of an amplifier of a column circuit according to a third embodiment.

In the third embodiment, the column circuit 103 has a configuration in which an amplification factor can be selectively changed for each column using an operational amplifier 901 by turning on/off switches SWa 902, SWb 903, and SWc 904, as shown in FIG. 14.

For example, an amplification factor when the switch SWa 902 is turned on is Ci/Cfa, which is the capacitance ratio of the capacitance Ci of a capacitor 908 and the capacitance Cfa of a capacitor 905. Further, when both switches SWa 902 and SWb 903 are turned on, the amplification factor is Ci/(Cfa+Cfb), which is the ratio of the capacitance Ci of the capacitor 908 to the sum of the capacitance Cfa of the capacitor 905 and the capacitance Cfb of a capacitor 906. In this embodiment, it is assumed that the circuit is configured such that when the switch SWa 902 is turned on, the amplification factor becomes 1.1, and when both the switches SWa 902 and SWb 903 are turned on, the amplification factor becomes 1.0.

Furthermore, when both switches SWa 902 and SWc 904 are turned on, the amplification factor is Ci/(Cfa+Cfc), which is the ratio of the capacitance Ci of the capacitor 908 to the sum of the capacitance Cfa of the capacitor 905 and the capacitance Cfc of a capacitor 907. In this embodiment, it is assumed that the circuit is configured so that when both the switches SWa 902 and SWc 904 are turned on, the amplification factor becomes 0.9.

In this embodiment, the ratio of the signal level C and the signal level D shown in FIG. 6 is calculated for each pixel, and if the ratio exceeds ±10%, for example, the switch is selected so that, if the signal level C is larger than the signal level D, the signal level is amplified by 1.1 and, if the signal level C is smaller, the signal level is reduced by 0.9 times. This information is stored for each pixel and the switches are controlled so that when a signal is read out to the column circuit 103, the appropriate switch/switches is/are turned on.

Note that with this control, unlike the methods in the first and second embodiments, it is not possible to match the signal levels of all pixels, but it is possible to make them close, so the luminance difference within an image can be reduced.

Figure 15:
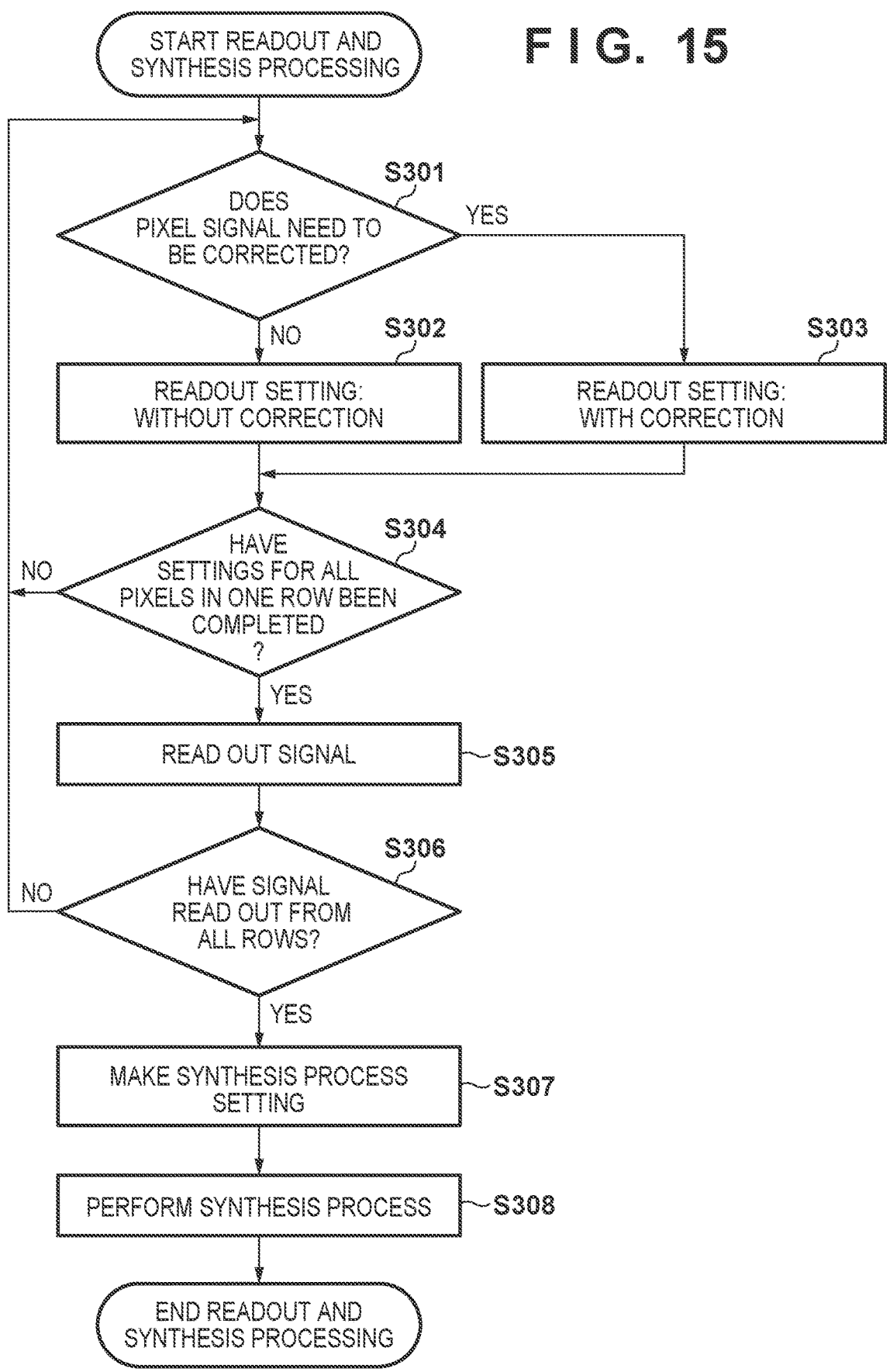
FIG. 15 is a flowchart illustrating processing in the third embodiment.

Next, processing at the time of signal read-our will be described using FIG. 15.

When the charge readout processing from the image sensor 111 is started, in step S301, it is determined for each pixel in the row from which charges are read out is a correction target pixel. Here, the determination is made based on whether or not a correction value is stored in advance for the pixel to be determined. If it is determined that the pixel is not a correction target pixel, the process proceeds to step S302, where signal readout operation without correction is set for both signals obtained with the charge accumulation period Tshort and the charge accumulation period Tlong.

On the other hand, if it is determined in step S301 that the pixel is a correction target pixel, the process advances to step S303, and a signal readout operation with correction is set for the column circuit 103 of the corresponding column of the image sensor 111. By setting the switches SWa 902, SWb 903, and SWc 904 in each column circuit 103 depending on whether a readout process without correction or with correction is set, it is possible to reduce variation in luminance between pixels.

In step S304, it is determined whether the settings for one row have been completed. If not, the process returns to step S301 and the process is repeated; if the settings have been completed, the process advances to step S305.

In step S305, a readout process is executed in which the pixel signal of each pixel 107 in one row of the image sensor 111 is amplified by the amplifier of the column circuit 103 using a set amplification factor and read out. The read pixel signal is output from the output circuit 105 to the image processing section 112.

Then, in step S306, it is determined whether signals have been read from all the rows included in one frame or a predetermined area, and if there is a row that has not been scanned, the process returns to step S301 and the above described processes are performed for the next row.

When signals are read out from all rows, in step S307, the image processing unit 112 makes dynamic range expansion processing setting including signal adjustment based on the ratio between the charge accumulation period Tlong and the charge accumulation period Tshort. Next, in step S308, a synthesis process for expanding the dynamic range of pixel signals is performed based on the setting, and processing for one frame is completed.

As described above, according to the third embodiment, by correcting the signal of the correction target pixel using analog gain, it is possible to reduce the difference in signal level between pixels. Thereby, images with a high dynamic range can be acquired in consecutive frames while suppressing variation in luminance within each image.

In this embodiment, the threshold value of the signal level ratio is set to, for example, ±10%, and one of three types of amplification factors is selected, but the present invention is not limited to this. For example, one of five or more types of amplification factors may be selected using a plurality of threshold values. By doing so, it is possible to further suppress luminance fluctuations between frames.

Note that in the first to third embodiments described above, the signal level corresponding to the charge accumulation period Tshort is corrected to match the signal level corresponding to the charge accumulation period Tlong, but the present invention is not limited to this, and any correction may be made to match the signal level corresponding to the charge accumulation period Tshort and the signal level corresponding to the charge accumulation period Tlong. For example, the signal level corresponding to the charge accumulation period Tlong may be adjusted to the signal level corresponding to the charge accumulation period Tshort, or instead of matching one of the signal level corresponding to the charge accumulation period Tlong and the charge accumulation period Tshort to the other, the signal levels may be adjusted to the median value of the difference between the signal levels.

Further, a configuration may be adopted in which the first to third embodiments described above are executed in combination as appropriate. For example, it is possible to combine the method of performing correction by changing the charge accumulation periods described in the second embodiment and the method of performing correction using digital gain described in the first embodiment. If correction is performed only using the method of the first embodiment, the noise component will also be amplified, but by performing the correction before transferring charge from the charge storage section, the amplification of the noise component can be minimized.

It is also conceivable to combine the method of performing correction using analog gain described in the third embodiment and the method of performing correction using digital gain described in the first embodiment.

Other Embodiments

The present invention may be applied to a system composed of a plurality of devices, or to an apparatus composed of a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-021871, filed Feb. 15, 2023 which is hereby incorporated by reference herein in its entirety.

What is claimed is:

1. An image capturing apparatus comprising:
a plurality of pixels; and
a correction unit, wherein each pixel includes:
- a photoelectric converter that photoelectrically converts incident light into charge;
- first and second charge holding sections that hold charge obtained by the photoelectric converter with first and second charge accumulation periods, respectively, and
- first and second floating diffusion portions that read out first and second signals corresponding to the charges held in the first and second charge holding sections, wherein the correction unit corrects signal levels of the first signal and the second signal based on a difference in capacitance between the first and second floating diffusion portions.

2. The image capturing apparatus according to claim 1, wherein the each pixel further includes third and fourth charge holding sections that hold the charge transferred from the first and second charge holding sections, respectively.

3. The image capturing apparatus according to claim 1, wherein the correction unit performs correction so as to reduce a difference between a signal level of the first signal and a signal level of a third signal based on a second ratio of the signal level of the first signal to the signal level of the third signal obtained by adjusting the second signal using a first ratio between the first charge accumulation period and the second charge accumulation period.

4. The image capturing apparatus according to claim 3, wherein the correction unit corrects at least one of the first signal and the second signal based on the second ratio.

5. The image capturing apparatus according to claim 1 further comprising a control unit that controls charge accumulation periods for the plurality of pixels,
wherein the correction unit corrects at least one of the first and second charge accumulation periods for the each pixel.

6. The image capturing apparatus according to claim 1, wherein the correction unit amplifies at least one of the first signal and the second signal.

7. The image capturing apparatus according to claim 3 further comprising a storage unit that stores a correction value obtained based on the second ratio in advance for each pixel,
wherein the correction unit performs correction using the correction value stored in the storage unit.

8. The image capturing apparatus according to claim 3, wherein the first charge accumulation period and the second charge accumulation period have different lengths, and
the image capturing apparatus further comprises a synthesizing unit that adjusts the first signal and the second signal based on the first ratio and synthesizes the adjusted signals.

9. The image capturing apparatus according to claim 1, wherein the first and second charge accumulation periods for each pixel are controlled by controlling timings of releasing a reset state of the photoelectric converter.

10. The image capturing apparatus according to claim 1, wherein the first and second charge accumulation periods for each pixel are controlled by controlling timings of transferring charge from the photoelectric converter to the first and second charge holding sections.

11. An image processing apparatus that processes signals output from an image capturing apparatus having a plurality of pixels, each of which including:
- a photoelectric converter that photoelectrically converts incident light into charge;
- first and second charge holding sections that hold charge obtained by the photoelectric converter with first and second charge accumulation periods, respectively, and
- first and second floating diffusion portions that read out first and second signals corresponding to the charges held in the first and second charge holding sections, the image processing apparatus comprising a correction unit that corrects signal levels of the first signal and the second signal based on a difference in capacitance between the first and second floating diffusion portions.

12. The image processing apparatus according to claim 11, wherein the each pixel further includes third and fourth charge holding sections that hold the charge transferred from the first and second charge holding sections, respectively.

13. The image processing apparatus according to claim 11, wherein the correction unit performs correction so as to reduce a difference between a signal level of the first signal and a signal level of a third signal based on a second ratio of the signal level of the first signal to the signal level of the third signal obtained by adjusting the second signal using a first ratio between the first charge accumulation period and the second charge accumulation period.

14. The image processing apparatus according to claim 13, wherein the first charge accumulation period and the second charge accumulation period have different lengths, and
the image processing apparatus further comprises a synthesizing unit that adjusts the first signal and the second signal based on the first ratio and synthesizes the adjusted signals.

15. A control method of an image capturing apparatus having a plurality of pixels, each of which including:
- a photoelectric converter that photoelectrically converts incident light into charge;
- first and second charge holding sections that hold charge obtained by the photoelectric converter with first and second charge accumulation periods, respectively, and
- first and second floating diffusion portions that read out first and second signals corresponding to the charges held in the first and second charge holding sections, the method comprising correcting signal levels of the first signal and the second signal based on a difference in capacitance between the first and second floating diffusion portions.

16. A non-transitory computer-readable storage medium, the storage medium storing a program that is executable by the computer, wherein the program includes program code for causing the computer to function as an image processing apparatus that processes signals output from an image capturing apparatus having a plurality of pixels, each of which including: a photoelectric converter that photoelectrically converts incident light into charge; first and second charge holding sections that hold charge obtained by the photoelectric converter with first and second charge accumulation periods, respectively, and first and second floating diffusion portions that read out first and second signals corresponding to the charges held in the first and second charge holding sections,
the image processing apparatus comprising a correction unit that corrects signal levels of the first signal and the second signal based on a difference in capacitance between the first and second floating diffusion portions.

* * * * *